(12) United States Patent
Pham

(10) Patent No.: US 7,076,038 B1
(45) Date of Patent: Jul. 11, 2006

(54) METHODS AND SYSTEMS FOR ENABLING CHARGING LAND-LINE LONG-DISTANCE CALLS TO WIRELESS SUBSCRIBER'S ACCOUNT

(75) Inventor: Kien Pham, Richardson, TX (US)

(73) Assignee: Nortel Networks Limited, St. Laurent (CA)

( * ) Notice: Subject to any disclaimer, the term of this patent is extended or adjusted under 35 U.S.C. 154(b) by 127 days.

(21) Appl. No.: 10/402,186

(22) Filed: Mar. 26, 2003

(51) Int. Cl.
*H04M 15/00* (2006.01)

(52) U.S. Cl. .............................. 379/114.21; 379/115.02; 379/127.04; 379/211.02; 455/408

(58) Field of Classification Search ........... 379/114.19, 379/114.2, 114.21, 114.23, 114.26, 115.02, 379/127.03, 127.04, 127.06, 207.14, 211.02; 455/405, 406, 407, 408
See application file for complete search history.

(56) References Cited

U.S. PATENT DOCUMENTS

| | | | |
|---|---|---|---|
| 6,333,976 B1 * | 12/2001 | Lesley | 379/114.01 |
| 6,529,593 B1 * | 3/2003 | Nelson | 379/114.2 |
| 6,615,034 B1 * | 9/2003 | Alloune et al. | 455/406 |
| 6,944,476 B1 * | 9/2005 | Altschul et al. | 455/557 |
| 2003/0096591 A1 * | 5/2003 | Pohutsky et al. | 455/406 |
| 2004/0058670 A1 * | 3/2004 | Pohutsky et al. | 455/406 |
| 2005/0101291 A1 * | 5/2005 | Scalisi et al. | 455/406 |

\* cited by examiner

*Primary Examiner*—Binh K. Tieu
(74) *Attorney, Agent, or Firm*—Carr LLP

(57) ABSTRACT

Disclosed is a method of and apparatus employing the method for automatically enabling long-distance calls on the land-line public telephone switched network and debiting the wireless subscriber's account an amount for the long-distance call. The method includes the steps of providing a predetermined telephone number having means for answering the call; answering the call, receiving a password entered by a user; comparing the entered password to a stored password to enable access to the landline public telephone switched system. The method also includes accepting a long-distance telephone number to be called, initiating a call on the land-line network at the entered long-distance telephone number. If the receiving instrument answers, the call is timed. Upon termination of the call, data is stored corresponding to the elapsed time of the call and the subscriber's account is debited an amount for the call.

33 Claims, 3 Drawing Sheets

METHODS AND SYSTEMS FOR ENABLING CHARGING LAND-LINE LONG-DISTANCE CALLS TO WIRELESS SUBSCRIBER'S ACCOUNT

TECHNICAL FIELD

The present invention relates in general to telecommunications and, in particular, to methods and systems for charging land-line long distance calls to a wireless subscriber's account.

BACKGROUND

Many wireless telephone subscription plans provide the ability to make long-distance telephone calls from a wireless telephone for no additional charges beyond the normal number of minutes used during the call. However, often a wireless subscriber will desire to use a land-line telephone on the public telephone switched network (PSTN) to make a long-distance call, for example, when the subscriber is using a telephone at work or otherwise does not have access to his or her wireless telephone. In such cases, the subscriber will need to either use a long-distance calling card or charge the charges to his or her home telephone number or credit card. However, often these numbers are long and difficult to remember and enter. Furthermore, the cost of making long-distance calls using a calling card may be undesirably high. Using a calling card may be particularly distasteful to a wireless telephone subscriber used to not paying any additional amount for long-distance calls, beyond the number of minutes of airtime.

There exists a need for a system allowing a wireless telephone subscriber to make long-distance calls from a land-line, and to automatically debit his or her wireless account for the long-distance call, by either deducting a certain number of minutes from the airtime account and/or deducting an amount of money correlated to the length of the long-distance call.

SUMMARY OF THE INVENTION

In one embodiment, the present invention comprises a method operable in a computer system for automatically enabling long-distance calls on the land-line public telephone switched network and debiting the wireless subscriber's account an amount for the long-distance call. In this embodiment it comprises providing a predetermined telephone number having means for answering the call, answering the call, receiving a password entered by a user and, if the stored password matches the entered password, enabling access to the land-line public telephone switched system and debiting the wireless subscriber's account for the call.

BRIEF DESCRIPTION OF THE DRAWINGS

For a more complete understanding of the present invention, and its advantages, reference will now be made in the following Detailed Description of the accompanying drawings, in which.

DETAILED DESCRIPTION

Figure 1:
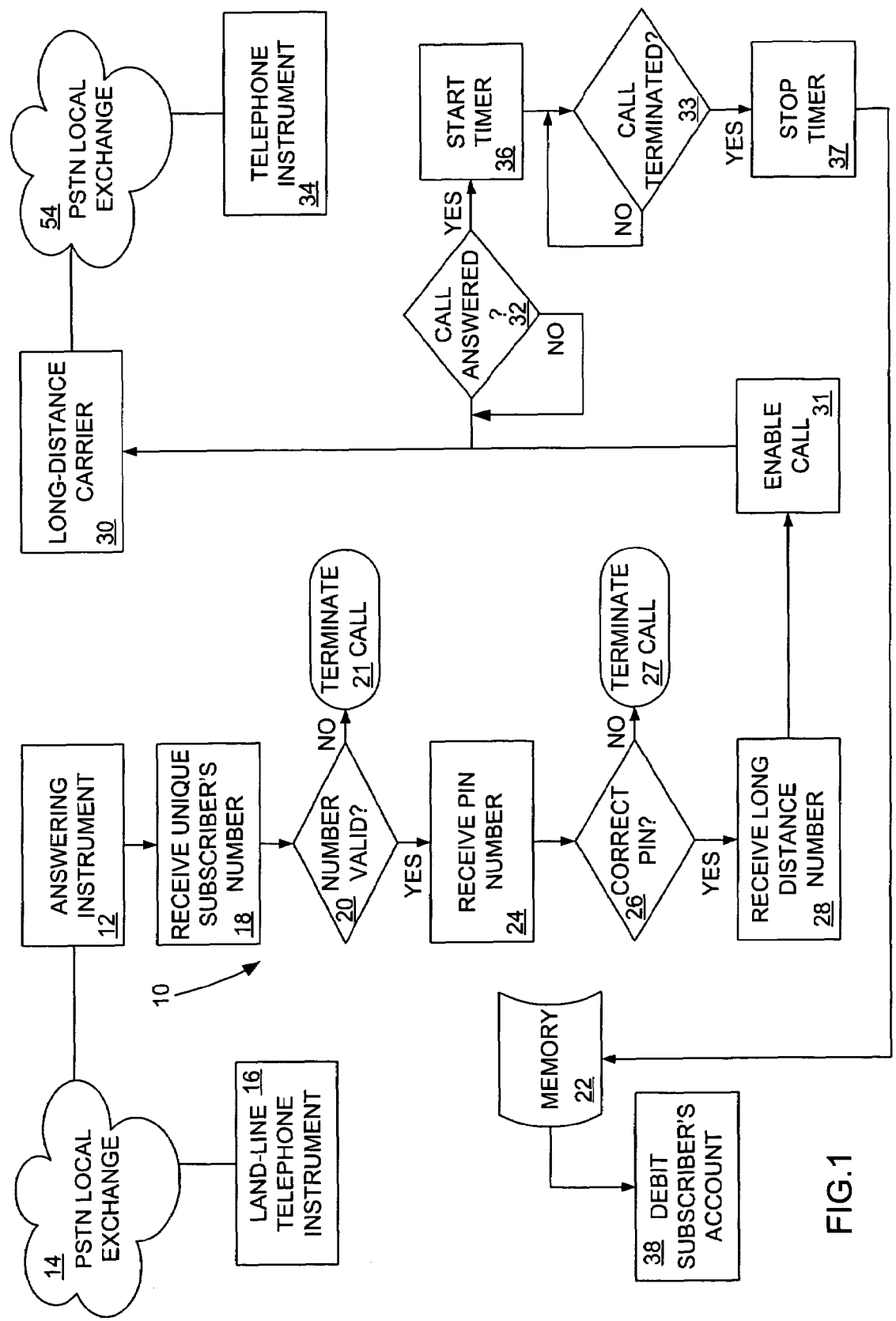
FIG. 1 is a schematic diagram depicting components and their operation where the method is initiated by a call to a common number for multiple subscribers.

Turning now to the drawings in detail, and initially to FIG. 1 thereof, a schematic block diagram of a computer system 10 for implementing an embodiment of the invention where the method is initiated by a call to a common number for multiple subscribers is depicted. The system 10 includes an answering instrument 12 connected to a PSTN local exchange system 14 to which a user desiring to make a call on a land-line telephone instrument 16 is connected. Answering instrument 12 has a predetermined telephone number or numbers associated with it and is accessible through the PSTN local exchange 14 by dialing its telephone number or numbers in the normal manner from land-line telephone instrument 16. In this embodiment, the telephone number of answering instrument 12 can be a toll-free telephone number that is used by multiple wireless subscribers.

Upon receiving a call at its predetermined number, answering instrument 12 answers the call. At this point, the system proceeds to the next step 18, which is receiving an input of a unique wireless telephone account number of the wireless subscriber. This unique wireless account number may be the subscriber's wireless telephone number, or any other number uniquely identifying that subscriber's wireless account. The system at step 18 may prompt the caller to enter his or her account number, although this is not required.

In the next step 20, the system checks the entered number against a list of valid account numbers stored in memory 22. Validity can be defined to include any one or more conditions, such as that the account number exists and/or that the account is current (i.e., that it is not in arrears) and/or that there are remaining airtime minutes for the month on the account, etc. If it is determined that the account number is not valid, the system terminates the call at step 21. Of course, the system may also permit limited multiple opportunities to re-enter a valid account number before terminating the call.

If the account number is determined to be valid, the system proceeds to step 24. In this step, the system receives an input of a password, also called a personal identification number (PIN). The system at step 24 may prompt the caller to enter his or her PIN number, although this is not required.

In the next step 26, the entered PIN number is compared to the PIN number stored in memory 22 for this subscriber's account. The system checks the entered number against the stored PIN number. If it is determined that the PIN does not match the stored PIN number, the system terminates the call at step 27. Of course, the system may also permit limited multiple opportunities to re-enter a correct PIN number before terminating the call.

If the PIN number is determined to be valid, the system proceeds to the next step 28, which is to receive the long-distance telephone number that the user wishes to call and has entered in his or her land-line telephone instrument. The system then enables the call in step 31 and accesses a long-distance carrier's long-distance carrier 30 connecting to a remote PSTN local exchange 54 and from there to the telephone instrument 34 that the user has dialed.

When the system detects that the telephone instrument has been answered at step 32, the system begins timing the call at step 36. When the system detects that the call has been terminated at step 33, the timer is stopped at step 37 and the elapsed time for the call is transmitted to memory 22. In addition to the elapsed time of the call, the system may also store other information associated with the call, such as the number from where the call was dialed, the number called, the time of day, etc.

In step 38, the subscriber's wireless account is debited an amount for the call. The debiting may be based upon debiting all, part or a multiple of the time spent on the long-distance call to the subscriber's airtime, or otherwise based upon some numerical function applied to the number of minutes. Alternatively, the long-distance call may be debited by converting the elapsed time into an amount of money based upon some numerical function, and added to the subscriber's monthly charges. The number of minutes or seconds may also be rounded up or down, as desired.

Figure 2:
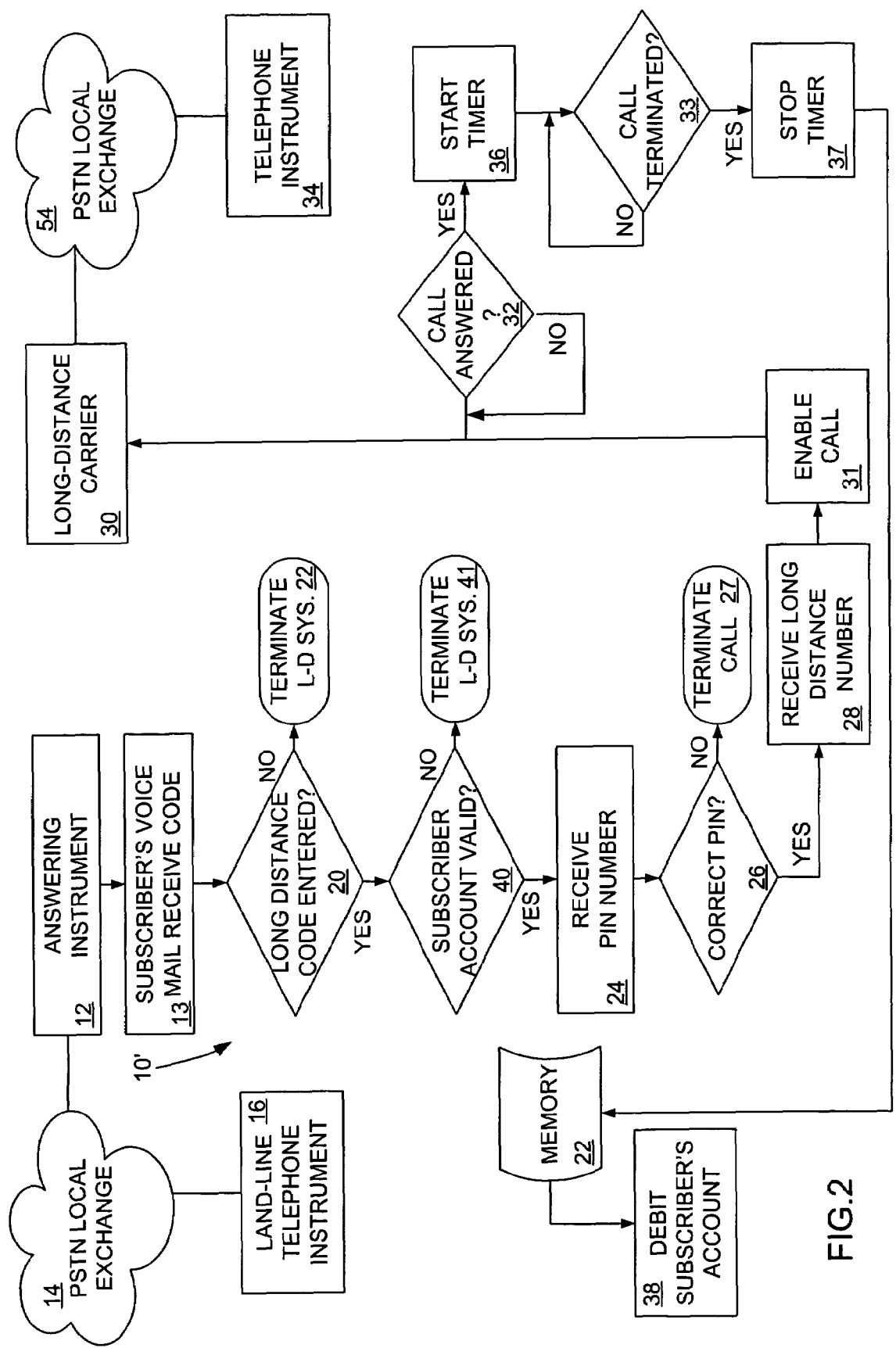
FIG. 2 is a schematic diagram depicting components and their operation where the method is initiated by a call to the wireless subscriber's wireless telephone number.

Turning now to FIG. 2, a schematic block diagram of a computer system 10' for implementing another embodiment of the invention is depicted, where the method is initiated by a call from the land-line to the subscriber's own wireless telephone number. The system 10' also includes an answering instrument 12 connected to the PSTN local exchange system 14 to which a user desiring to make a call on a land-line telephone instrument 16 is connected. In this case, answering instrument 12 is connected to a voice mail system 13.

When the caller does not answer his or her wireless telephone number, the voice mail system 13 answers. At this point, the voice-mail system 13 permits the caller to enter a code indicating which of various choices is desired, such as leaving a voice-mail, playing back previously stored voice-mails, changing the voice-mail message, etc. At this point, the system of the present invention is adapted to receive a code, usually a number, entered by the caller indicating a desire to make a long-distance call.

In the next step 20, if the code for making a long-distance call has been entered, the system proceeds to optional step 40. If not, the system terminates the long-distance calling system at step 22. Of course, the system at that point may provide other services in response to the entry of different codes, but such need not be described herein.

In step 40, as will be apparent, because the subscriber's own wireless telephone number has been called, there is no need to separately enter the wireless subscriber's account number to tell the system which account is to be debited. Nevertheless, it may be desirable (though not necessary) to check the account for validity conditions such as that the account is current (i.e., that it is not in arrears) and/or that there are remaining airtime minutes for the month on the account, etc. If it is determined in step 40 that the account number is not valid, the system terminates the long-distance calling system at step 41.

If the account is determined to be valid, the system proceeds to step 24. In this step, the system receives an input of a password, also called a personal identification number (PIN). The system at step 24 may prompt the caller to enter his or her PIN number, although this is not required. If the PIN number is determined to be valid, the system proceeds to the next step 28, which is to receive the long-distance telephone number that the user wishes to call and has entered in his or her land-line telephone instrument. The system then accesses a long-distance carrier's long-distance communication channel 30 connecting to a remote PSTN local exchange 54 and from there to the telephone instrument 34 that the user has dialed. The operation of the remainder of the system 10' is the same as described for system 10 depicted in FIG. 1 and need not be further described.

Figure 3:
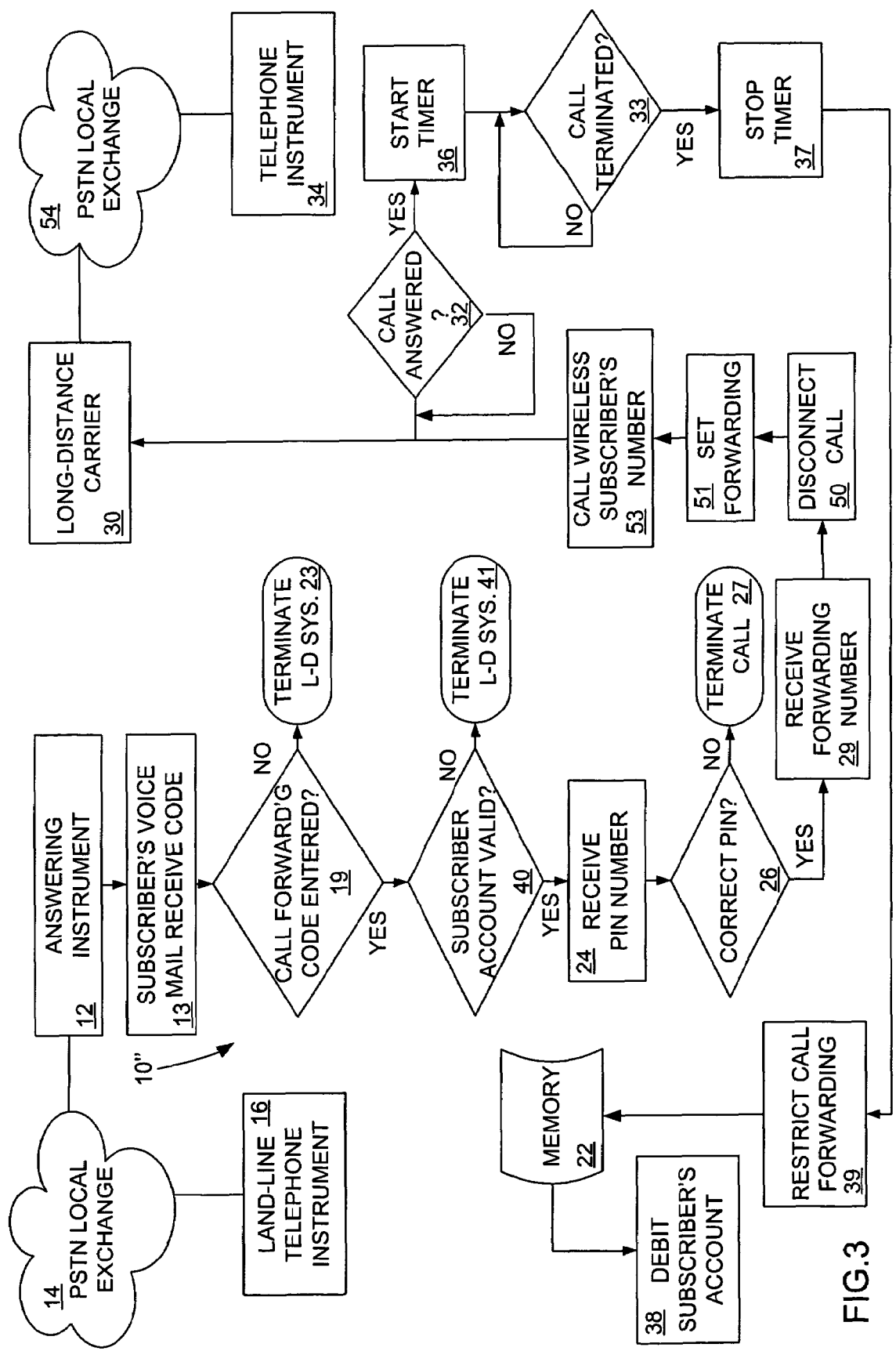
FIG. 3 is a schematic diagram depicting components and their operation where the method is initiated by a call to the wireless subscriber's wireless telephone number and the call forwarding feature of the wireless telephone is used.

Turning now to FIG. 3, a schematic block diagram of a computer system 10" for implementing yet another embodiment of the invention is depicted. In this case, the method is initiated by a call to the subscriber's own telephone number, but which can make use of the call forward feature available for wireless telephones to make the long-distance call from a land-line. The system 10" includes an answering instrument 12 connected to the PSTN local exchange system 14 to which a user desiring to make a call on a land-line telephone instrument 16 is connected. In this case, answering instrument 12 is connected to a voice-mail system 13.

When the caller does not answer the telephone call to his or her wireless telephone number, the voice-mail system 13 answers. At this point, the voice-mail system 13 permits the caller to enter a code indicating which of various choices is desired, such as leaving a voice-mail, playing back previously stored voice-mails, changing the voice-mail message, activating call forwarding, etc. At this point, the system of the present invention is adapted to receive a code, usually a number, entered by the caller on the land-line indicating a desire to forward calls to his/her wireless number to another number.

In the next step 19, if the code for forwarding calls has been entered, the system proceeds to optional step 40. If not, the system terminates the long-distance system at step 23. Of course, the system at that point may provide other services in response to the entry of different codes, but such need not be described herein.

In step 40, as will be apparent, because the subscriber's own wireless telephone number has been called, there is no need to separately enter the wireless subscriber's account number to tell the system which account is to be debited. Nevertheless, it may be desirable (though not necessary) to check the account for validity conditions such as that the account is current (i.e., that it is not in arrears) and/or that there are remaining airtime minutes for the month on the account, etc. If it is determined in step 40 that the account number is not valid, the system terminates the long-distance system at step 41.

If the account is determined to be valid, the system proceeds to step 24. In this step, the system receives an input of a password, also called a personal identification number (PIN). The system at step 24 may prompt the caller to enter his or her PIN number, although this is not required. If the PIN number is determined to be valid, the system proceeds to the next step 29, which is to receive the number to which the caller wishes to forward calls, which in this case will be the long-distance telephone number that the user wishes to call, which will be entered in his or her land-line telephone instrument.

In an embodiment, in step 50, the call to the wireless telephone number is then automatically disconnected, upon which the call forwarding to the entered number is set in step 51, and then the system automatically calls the wireless subscriber's number in step 53. With the call forwarding now set, this call is routed to the forwarding number, which is the long-distance number desired. Of course, the call to the wireless telephone number may also be manually disconnected by the caller, to set the call forwarding to the entered number. Then the caller can manually call his/her wireless telephone number. With the call forwarding now set, this call is routed to the forwarding number, which is the long-distance number desired, as before.

In the next step, the system accesses a long-distance carrier's long-distance communication channel 30 connecting to a remote PSTN local exchange 54 and from there to the telephone instrument 34 that the user has dialed. From that point until step 33, the operation of the system 10 is the same as described for system 10' depicted in FIG. 1 and need not be further described.

In step 33, after the call is terminated, the call forwarding to that number normally would still be active. Thus, if a third party were to call the user's wireless number, that call would be forwarded to the previously called long-distance number, which may be undesirable. Accordingly, to prevent this, this embodiment includes a step 39, which restricts further call forwarding. The restriction on call forwarding can cause cancellation of the call forwarding. The restriction can also be less restrictive, such as restricting call forwarding to only those calls originating from the telephone number from which the user called to activate the call forwarding. In the latter case, as long as the user called from the same telephone, to his/her wireless telephone number, the call would be forwarded to the desired long-distance number without the need to reenter it.

It is understood that the present invention can take many forms and embodiments. Accordingly, several variations may be made in the foregoing without departing from the spirit or the scope of the invention. For example, specific features such as the location-based services may be extracted without negating the novelty or usefulness of other aspects of the invention. Likewise, the system architecture was designed to easily add new services and features, including, but not limited to, additional servers to provide greater functionality or further take advantage of other existing products.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A method operable in a computer system for automatically enabling a long-distance call on a land-line public telephone switched network and debiting a wireless subscriber's account an amount for a long-distance call, wherein the wireless subscriber's account is not a prepaid account, comprising the steps of:
providing a predetermined telephone number, wherein the predetermined telephone number is the telephone number of the wireless subscriber to whose account the telephone call is to be debited;
answering the call at the predetermined number;
receiving a password entered by a user;
comparing the entered password to a stored password and, if the stored password matches the entered password, enabling further use of the method by the user;
accepting a long-distance telephone number to be called;
initiating a call on the land-line public telephone switched network to a receiving instrument at the long-distance telephone number to be called; and
debiting the wireless subscriber's account an amount for the call.

2. The method defined in claim 1, further comprising receiving a predetermined code after the system answers the telephone call indicating a request to make a land-line long-distance telephone call on the public telephone switched network.

3. The method defined in claim 1, further comprising:
beginning timing the call;
upon termination of the call, determining elapsed time for the call; and
storing data corresponding to the elapsed time of the call in a memory associated with the wireless subscriber's account.

4. The method defined in claim 3 wherein the amount debited to the subscriber's account is correlated to the elapsed time of the call.

5. The method defined in claim 4 wherein the amount debited to the subscriber's account is a monetary amount.

6. The method defined in claim 4 wherein the amount debited to the subscriber's account is a number of minutes of wireless airtime correlated to the elapsed time of the call.

7. The method defined in claim 6 wherein the number of minutes debited is equal to the elapsed time of the call, rounded.

8. The method defined in claim 6 wherein the number of minutes debited is equal to a numerical factor multiplied by the elapsed time of the call, rounded.

9. A computer system for automatically enabling a long-distance call on a land-line public telephone switched network and debiting a wireless subscriber's account an amount for the long-distance call, wherein the wireless subscriber's account is not a prepaid account, comprising:
an answering instrument having means for answering a telephone call from the land-line public telephone switched network to a predetermined telephone number, wherein the predetermined telephone number is the telephone number of the wireless subscriber to whose account the telephone call is to be debited;
means for receiving a password entered by a user;
means for comparing the entered password to a stored password and, if the stored password matches the entered password, enabling further operation of the system;
means for accepting a long-distance telephone number to be called;
means for initiating a call on the land-line public telephone switched network to a receiving instrument at the long-distance telephone number; and
means for debiting the wireless subscriber's account an amount for the call.

10. The system defined in claim 9, further comprising means for receiving a predetermined code after the system answers the telephone call indicating a request to make a land-line long-distance telephone call on the public telephone switched network.

11. The system defined in claim 9, further comprising:
means for beginning timing the call;
means determining elapsed time for the call upon termination of the call; and
means for storing data corresponding to the elapsed time of the call in a memory associated with the wireless subscriber's account.

12. The system defined in claim 11 wherein the amount debited to the subscriber's account is correlated to the elapsed time of the call.

13. The system defined in claim 12 wherein the amount debited to the subscriber's account is a monetary amount.

14. The system defined in claim 12 wherein the amount debited to the subscriber's account is a number of minutes of wireless airtime correlated to the elapsed time of the call.

15. The system defined in claim 14 wherein the number of minutes debited is equal to the elapsed time of the call, rounded.

16. The system defined in claim 14 wherein the number of minutes debited is equal to a numerical factor multiplied by the elapsed time of the call, rounded.

17. A computer system for automatically enabling a long-distance call on a land-line public telephone switched network and debiting a wireless subscriber's account an amount for the long-distance call, comprising:
    a call answering instrument adapted to answer a telephone call from the land-line public telephone switched network to a telephone number of the wireless subscriber's account;
    a memory adapted to receive a password entered by a user;
    a comparing element adapted to compare the entered password to a stored password and, if the stored password matches the entered password, enabling further operation of the system;
    a memory for accepting a long-distance telephone number to be called;
    a call initiator on the land-line public telephone switched network or connecting to a receiving instrument at the long-distance telephone number; and
    a memory element for debiting the wireless subscriber's account an amount for the call.

18. The system defined in claim 17 wherein the call answering instrument is a call answering instrument of the wireless subscriber's telephone number.

19. The system defined in claim 18 further comprising a comparing element for determining whether a predetermined code has been entered indicating a request to make a land-line long-distance telephone call on the public telephone switched network.

20. The system defined in claim 17, further comprising:
    a timer and determining the elapsed time of the call;
    a memory storing data corresponding to the elapsed time of the call in a memory associated with the wireless subscriber's account.

21. The system defined in claim 20 wherein the amount debited to the subscriber's account is correlated to the elapsed time of the call.

22. The system defined in claim 20 wherein the amount debited to the subscriber's account is a monetary amount.

23. The system defined in claim 20 wherein the amount debited to the subscriber's account is a number of minutes of wireless airtime correlated to the elapsed time of the call.

24. The system defined in claim 23 wherein the number of minutes debited is equal to the elapsed time of the call, rounded.

25. The system defined in claim 23 wherein the number of minutes debited is equal to a numerical factor multiplied by the elapsed time of the call, rounded.

26. A computer program implementable by a computer system to automatically enable a long-distance call on a land-line public telephone switched network and debiting a wireless subscriber's account an amount for a long-distance call, wherein the wireless subscriber's account is not a prepaid account, comprising the steps of:
    providing a predetermined telephone number, wherein the predetermined telephone number is the telephone number of the wireless subscriber to whose account the telephone call is to be debited;
    answering the call at the predetermined number;
    receiving a password entered by a user;
    comparing the entered password to a stored password and, if the stored password matches the entered password, enabling further use of the method by the user;
    accepting a long-distance telephone number to be called;
    initiating a call on the land-line public telephone switched network to a receiving instrument at the long-distance telephone number to be called; and
    debiting the wireless subscriber's account an amount for the call.

27. The computer program defined in claim 26 further comprising receiving a predetermined code after the system answers the telephone call indicating a request to make a land-line long-distance telephone call on the public telephone switched network.

28. The computer program defined in claim 26, further comprising:
    beginning timing the call;
    upon termination of the call, determining elapsed time for the call; and
    storing data corresponding to the elapsed time of the call in a memory associated with the wireless subscriber's account.

29. The computer program defined in claim 28 wherein the amount debited to the subscriber's account is correlated to the elapsed time of the call.

30. The computer program defined in claim 29 wherein the amount debited to the subscriber's account is a monetary amount.

31. The computer program defined in claim 29 wherein the amount debited to the subscriber's account is a number of minutes of wireless airtime correlated to the elapsed time of the call.

32. The computer program defined in claim 31 wherein the number of minutes debited is equal to the elapsed time of the call, rounded.

33. The computer program defined in claim 31 wherein the number of minutes debited is equal to a numerical factor multiplied by the elapsed time of the call, rounded.

* * * * *